United States Patent [19]

Grant et al.

[11] Patent Number: 4,819,096
[45] Date of Patent: Apr. 4, 1989

[54] ROTARY HEAD SCANNER INCLUDING ANAMORPHIC BEAM-SHAPING APPARATUS IN AN OPTICAL SIGNAL-TRANSMISSION CHANNEL

[75] Inventors: Frederic F. Grant, Bellflower; John P. Grant, Downey, both of Calif.

[73] Assignee: Datatape Incorporated, Pasedena, Calif.

[21] Appl. No.: 211,933

[22] Filed: Jun. 27, 1988

Related U.S. Application Data

[63] Continuation-in-part of Ser. No. 922,240, Oct. 23, 1986, abandoned.

[51] Int. Cl.⁴ .............................................. G11B 5/52
[52] U.S. Cl. ...................................... 360/108; 360/84; 350/420
[58] Field of Search ................... 360/64, 108, 114, 84, 360/107; 369/97, 100, 112, 120, 121; 350/420, 421, 431; 356/218, 225; 250/201, 237 G; 358/286

[56] References Cited

U.S. PATENT DOCUMENTS

| | | | |
|---|---|---|---|
| 3,860,747 | 1/1975 | Orii et al. | 358/286 |
| 3,893,129 | 7/1975 | Endo et al. | 250/201 X |
| 4,203,668 | 5/1980 | Chapman | 356/215 |
| 4,444,459 | 4/1984 | Woodwell | . |
| 4,455,584 | 6/1984 | Heitmann | 360/108 |
| 4,470,662 | 9/1984 | Mumzhiu | 350/486 X |
| 4,490,608 | 12/1984 | Yeadon et al. | 250/237 G X |
| 4,542,492 | 9/1985 | Leterme et al. | 369/46 |
| 4,594,699 | 6/1986 | Browder | 369/13 |
| 4,607,356 | 8/1986 | Bricot et al. | 369/44 |
| 4,623,225 | 11/1986 | Forkner | 350/421 |
| 4,627,690 | 12/1986 | Fantone | 350/421 |
| 4,643,538 | 2/1987 | Wilson | 350/112 X |

FOREIGN PATENT DOCUMENTS

| | | | |
|---|---|---|---|
| 0061194 | 9/1982 | European Pat. Off. | 369/97 |
| 0074796 | 9/1982 | European Pat. Off. | . |
| 53-21912 | 2/1978 | Japan | 360/108 |

Primary Examiner—Alan Faber
Assistant Examiner—W. R. Young
Attorney, Agent, or Firm—Dennis P. Monteith

[57] ABSTRACT

Rotary scanner apparatus includes a magnetic head on the periphery of a rotatable headwheel having a central axis of rotation, and an off-axis light source for projecting a collimated beam of information-bearing light obliquely onto a planar photodetector on the axis of the headwheel. To optimize electro-optical "action", and thereby enhance signal-to-noise ratio, optical apparatus, interposed between the light source and the photodetector, has an optical characteristic for shaping the light beam, to cuase the size and shape of its cross section, at a plane of incidence coinciding with the photodetector, to correspond substantially to the size and shape of the light-sensitive surface of the photodetector. Preferably, the optical apparatus includes a prism pair of performing anamorphic beam contraction, to convert the beam shape to circular, in its plane of incidence.

4 Claims, 6 Drawing Sheets

ROTARY HEAD SCANNER INCLUDING ANAMORPHIC BEAM-SHAPING APPARATUS IN AN OPTICAL SIGNAL-TRANSMISSION CHANNEL

This is a continuation-in-part of application Ser. No. 922,240, filed Oct. 23, 1986, now abandoned.

CROSS-REFERENCE TO A RELATED APPLICATION

Reference is hereby made to U.S. patent application Ser. No. 819,668 entitled Apparatus For Contemporaneously Coupling Signals To And From A Rotary Head Scanner, by R. Raviv, filed on Jan. 17, 1986, now abandoned.

BACKGROUND OF THE INVENTION

1. Field of the Invention

The invention relates to recording and playback of signals from a magnetic tape. In particular, the invention relates to a bidirectional signal-transmission channel for optically coupling record and playback signals to and from a rotary magnetic head scanner.

2. Description Relative to the Prior Art

A digital recording system must be capable of handling a very high data rate if a large quantity of data is to be recorded in a relatively brief time interval. The need to enhance the data recording rate and packing density capability of a digital tape recorder of the rotary head scanner type places severe demands on existing methods for transferring a data signal to and from each magnetic head on the scanner.

Currently, the commonly used rotary transformer limits a data signal to a rotary head to about 50 megahertz (MHz). A currently proposed advanced digital tape recording system is to handle data at a 300 megabit per second (Mb/sec) rate. The minimum bandwidth for such data, however, is 450 MHz, which, of course, is well beyond the frequency range of rotary transformers known in the art. Even with the introduction of electronics integral to a headwheel and improved transformer characteristics, a rotary transformer has a predicted upper bandwidth of only approximately 150 MHz. Accordingly, a rotary transformer suffers from a disadvantage in its ability to handle the high data rate required for a future digital recording system.

It is known in the prior art that optical coupling of signals to and from a rotary head scanner offers potential advantages over a rotary transformer. Optical coupling permits broadband signal recording and reproduction with high efficiency and good signal-to-noise; also crosstalk between signals can be virtually eliminated.

European patent application No. 0 074 796 discloses apparatus for providing optical coupling to a rotary head scanner. For that purpose, a laser diode, located on the rotational axis of the headwheel, is intended to serve a dual function—light-emitting in a playback mode and light-receiving in a record mode. To those ends, an external mode switch functions to reverse bias the diode during a recording operation and to forwardly bias the diode during playback.

As evidenced by the need for an external mode switch, operating a laser diode in a dual mode adds complexity to the headwheel electronics. Furthermore, it is believed that, with a "dual-function" laser diode, the signal-to-noise ratio and bandwidth of the record and/or playback signals may be compromised as it would not be reasonable to expect optimum diode performance in both operating modes.

Copending U.S. patent application Ser. No. 819,668, filed Jan. 17, 1986, now abandoned, discloses a single optically coupled channel having separate optical paths for the record and playback signals. With two magnetic heads—one for recording and the other for playback—record and playback signals may be coupled contemporaneously to and from the head scanner, for testing and certifying the operation of the recording apparatus in real time.

To couple a record signal to the head scanner, a laser, located off-axis on the stationary side of the scanner, serves to direct a modulated beam of collimated light obliquely onto a first photodetector, mounted on the rotational axis of the headwheel. Similarly, to optically couple a playback signal, a separate laser, located on the headwheel slightly off-axis, projects modulated collimated light obliquely onto a second photodetector, also aligned with the headwheel axis on the stationary side of the scanner. As the headwheel rotates, light from the "playback" laser defines a conical surface of revolution, with the apex of the cone coincident with the "playback" photodetector.

To maximize the signal-to-noise ratio of an optical channel, it is necessary to optimize the electro-optical "action" at each photodetector. The cross section of a collimated light beam, measured at an imaginary reference plane of orthogonal to the beam, is, of course, different than the cross section of the beam, measured at an oblique plane. Accordingly, when the laser beam, at its point of origin, is circular and the light-receiving area of the photodetector is circular, as is usually the case, the size and shape of the cross section of the light beam, at its plane of incidence, would not be matched to the photoconductive surface. Thus, the optical channel would lose signal-to-noise ratio because the electro-optical transducing action would not be maximized.

When the light source is near the rotational axis, as taught in the aforementioned Ser. No. 819,668, dispersion of the light beam, due to its angle of approach, would be negligible. Although the optical channel of 819,668 has been found to work well for its intended purpose, it is not always possible to provide each light source in close proximity to the on-axis position of the photodetector, particularly with a modern head scanner of compact design.

SUMMARY OF THE INVENTION

In view of the foregoing, an object of the invention is to enhance the signal-to-noise ratio of an optical signal-transmission channel of the type having at least one photodetector on the rotational axis of a rotary head scanner and a corresponding off-axis light source that projects a collimated beam of information-bearing light—either for recording or for playback—obliquely onto the photodetector. This object is achieved, for either direction of signal flow, by means of optical apparatus interposed between the photodetector and the light source. The optical apparatus has an optical characteristic for shaping the light beam—either contracting or expanding—to cause the size and shape of its cross section, at its plane of incidence coinciding with the photodetector, to correspond substantially to the size and shape of the light-sensitive receiving area of the photodetector.

The optical apparatus compensates for beam expansion caused by projecting the information-bearing beam obliquely onto the photodetector. In a preferred embodiment, the optical apparatus comprises a pair of prisms, defining rings concentric with the rotational axis, for performing anamorphic beam contraction in a given direction to offset the effective widening of the cross section of the beam in the corresponding direction due to it striking the photodetector at an oblique angle. In a further preferred embodiment, a ring-like Littrow prism may be combined with other prisms to perform more complicated beam manipulations very compactly. For example, a forty-five degree (45°) right-angle prism may be cemented to the hypotenuse of the Littrow prism, resulting in anamorphic beam contraction with no directional deflection.

With the cross section of the light beam (at its plane of incidence) corresponding substantially to the light-sensitive area of the corresponding photodetector, the light beam is neither too large, which would waste information-bearing optical energy, nor is it too small, which would reduce the sensitivity of the photodetector. Thus, a maximum electro-optical "action" is effected, in either direction of signal flow, to enhance the signal-to-noise ratio of the optical channel.

These and other advantages of the invention will become more apparent in the detailed description of preferred embodiments presented below.

DESCRIPTION OF THE DRAWINGS

In the detailed description of the invention presented below, reference is made to the accompanying drawings, in which.

DETAILED DESCRIPTION OF PREFERRED EMBODIMENTS OF THE INVENTION

Figure 1:
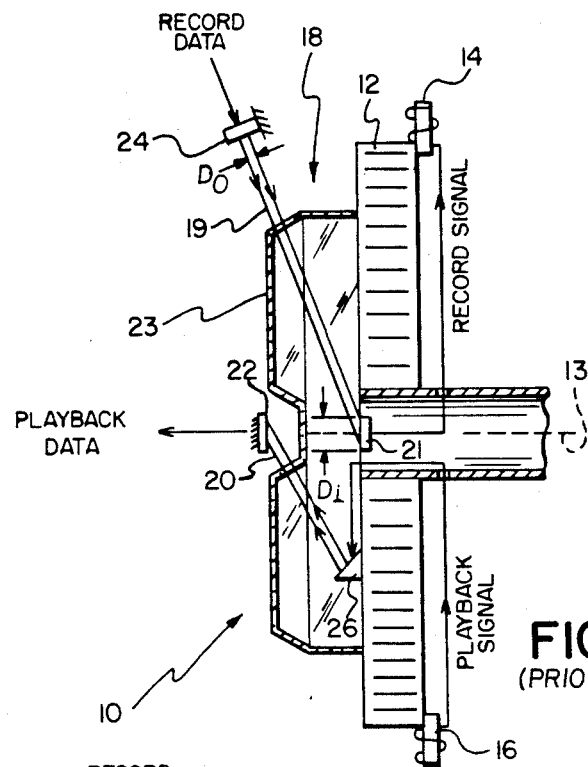
FIG. 1 is a side elevation view of prior art rotary head scanner apparatus having an optical signal-transmission channel.

FIG. 1 shows magnetic head scanner apparatus 10 having a headwheel 12 mounted for rotation about a central axis 13. The headwheel 12 has mounted on its periphery one or more angularly distributed magnetic heads. As is well known in the tape recording art, each head serves for making successive operative sweeps along record tracks traversing a magnetic tape (not shown) wrapped partially around the scanner apparatus. In the embodiment of FIG. 1, the headwheel 12 is shown as carrying a magnetic record head 14 and a diametrically opposed playback head 16.

For high data rate recording, the scanner apparatus 10 has a bidirectional signal-transmission channel 18 for optically transferring a record/playback signal to/from the headwheel 12. For that purpose, the channel 18 includes separate optical paths 19, 20 for transferring, respectively, an optical record signal and an optical playback signal onto a pair of corresponding planar photodetectors 21, 22, spaced apart on the axis 13. To that end, the photodetector 21, which is preferably mounted for rotation in synchronism with the headwheel 12, serves in a record mode for coupling data from a stationary point to the rotary headwheel. The photodetector 22, which functions in a playback mode, is mounted in a fixed position on the axis 13 for transferring data in the opposite direction from the rotary headwheel.

To couple a record signal to the magnetic record head 14, a laser 24, located off-axis, serves to project a beam of collimated light, modulated in accordance with a signal to be recorded, through a transparent member 23 obliquely onto the photodetector 21. Similarly in playback, a "playback" laser 26, located off-axis, preferably on the headwheel 12, projects a beam of modulated light obliquely onto the photodetector 22.

The axis 13 serves as a stationary point. Thus, in operation, an optical signal can be coupled to each of the photodetectors 21, 22 between the stationary and the rotary portion of the scanner apparatus 10. In a playback mode, for example, as the headwheel 12 rotates, collimated light from the laser 26 defines a conical surface of revolution, with the apex of the cone coincident with the photodetector 22.

In an alternate embodiment (FIG. 2), a polished and conical surface 30 of the transparent apparatus 23, which preferably is mounted on the headwheel 12 for rotation therewith, serves, in a record mode, for deflecting a radially directed light beam onto the photodetector 21. In playback, the surface 30 serves to pass or transmit light directly from the laser 26 to the photodetector 22. For those purposes, the conical surface preferably comprises a half-mirror for transmitting light produced by the laser 26 and reflecting light emitted by the laser 24. To those ends, the laser 26 emits light of a frequency different from the frequency of the light emitted by the laser 24. Japanese Kokai application No. 53-21912, which is incorporated herein by reference, discloses head scanner apparatus having half-mirror optical apparatus for use with dual light sources.

The member 23 may also include a second conical surface (not shown), located axially immediately adjacent the headwheel 12, to deflect a playback light beam, projected radially from the laser 26, onto the photodetector 22. (Elements of FIG. 2 that are otherwise identical or similar to the elements of FIG. 1 are identified by like numerals.)

Figure 3A:
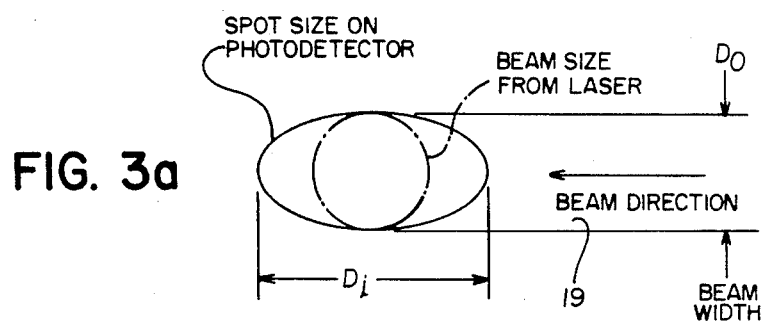
FIGS. 3(a) and 3(b) illustrate, in accordance with the embodiments of FIGS. 1 and 2, the cross section of a circular beam of light in its plane of incidence.

FIG. 3(a) shows that, when a light beam of circular cross section follows a straight-line path intersecting a planar photodetector obliquely, as exemplified by either of the light paths 19, 20 of FIG. 1, the cross section of the light beam, at its plane of incidence—the light-sensitive receiving surface of the photodetector—is elliptical. The minor axis of the ellipse corresponds to the width of the light beam (when viewed from the side) and is equal to the diameter, $D_o$, of the circular beam; the major axis of the ellipse, $D_i$, which is aligned with the direction of the light beam, corresponds to the height of the light beam (again when viewed from the side) multiplied by a factor equal to the cosecant of the beam's angle of incidence.

Figure 2:
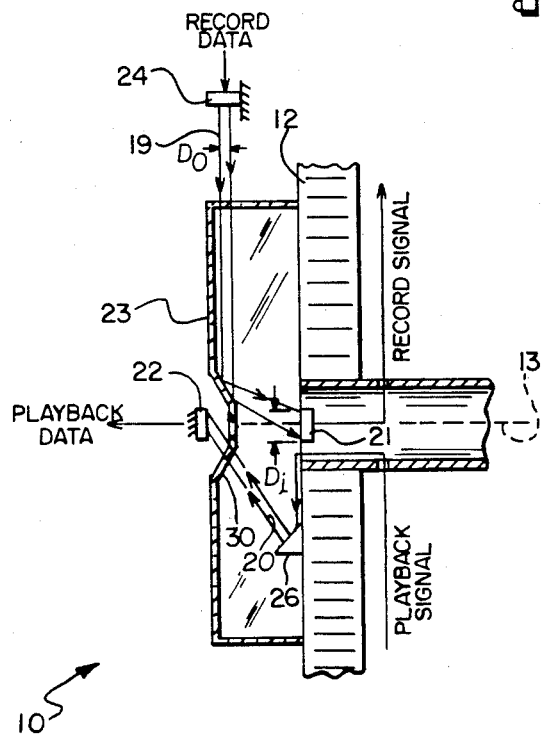
FIG. 2 is a side elevation view of an alternate embodiment of prior art rotary head scanner apparatus having an optical signal-transmission channel.
Figure 3B:
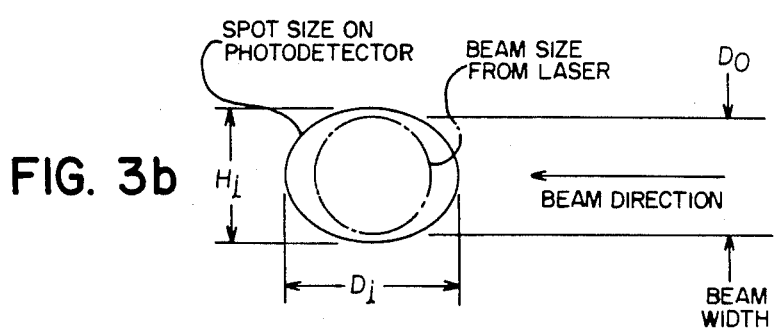

FIG. 3(b) shows that, when a circular light beam follows a piecewise linear path, as shown by the path 19 in FIG. 2, its cross section, in a plane coicident with the photodetector, is again elliptical. In this case, however, the beam expands in two orthogonal directions—perpendicular to and in the direction of propagation. The conical surface 30 causes expansion of the beam in one direction—a circular beam of diameter $D_o$ expands to $H_i$—and the angle of approach to the photodetector causes beam expansion in the other direction—the beam expands to $D_i$.

In the illustrations of FIG. 3, it has been assumed that a laser produces a circular beam. Other beam shapes, of course, are possible. For example, a laser diode commonly has an asymmetric radiation pattern caused by diffraction at the laser diode cavity. When a lens is used to collimate this asymmetrical pattern, a beam with an elliptical cross section results. Whatever the original beam shape, its cross section, at its plane of incidence, is functionally related to the beam's angle of approach to the light-receiving surface of the photodetector.

An object of the invention is to enhance the signal-to-noise ratio of the optical channel 18 of the rotary scanner apparatus 10. However, when the cross section of either light beam (record or playback) is larger than the light-sensitive receiving area of its corresponding photodetector, information-bearing optical energy is wasted. Conversely, when either light beam is smaller than the light-sensitive receiving area, the sensitivity or gain of the photodetector is reduced. In either case, signal-to-noise ratio is lower than it could be.

To overcome this problem, the invention requires optical apparatus, interposed between the source of information-bearing light and its corresponding photodetector, for causing the size and shape of the cross section of each light beam, at its plane of incidence with the corresponding photodetector, to correspond substantially in size and shape to the light-sensitive receiving area of the photodetector. By way of example, and not by limitation, assuming that each photodetector has a circular light-sensitive receiving area, optical apparatus, in accordance with the invention, comprises anamorphic beam-shaping components that serve to shape the projected laser beam so that its cross section, in a plane coincident with the corresponding photodetector, is also circular, with a diameter equal to that of the photodetector.

To understand how the above is accomplished, assume a case in which a light beam at its source and an information-receptive surface onto which the beam is to be projected are both circular and are both the same size. In particular, assume they both have a diameter $D_o$ and the light beam is to be projected obliquely onto the photodetector. In this case, anamorphic beam-shaping apparatus serves to narrow the cross section of the projected light beam to offset the effective expansion that the light beam undergoes, in its plane of incidence, when projected obliquely onto the photodetector. Such expansion, of course, was described previously herein and illustrated in FIGS. 3(a) and 3(b).

Figure 4A:
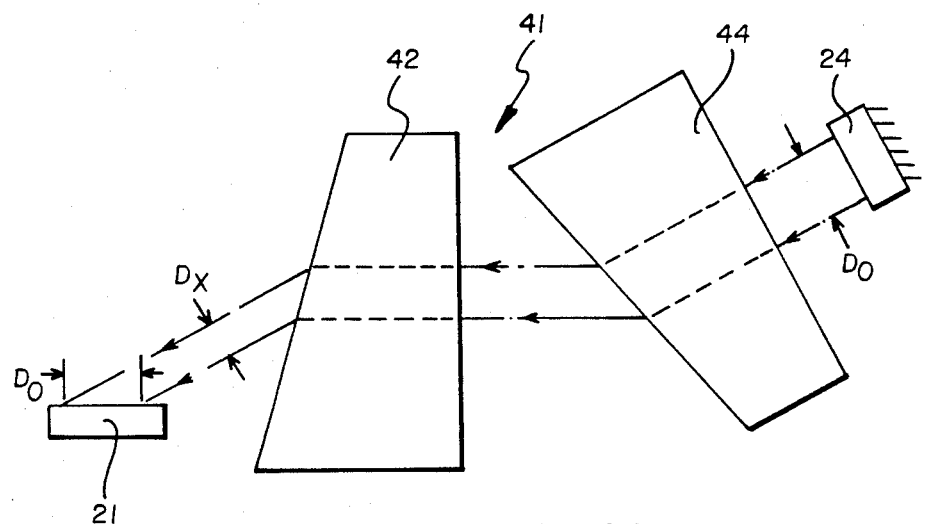
FIGS. 4(a), 4(b) and 4(c) are cross-sectional views useful in understanding anamorphic beam-shaping apparatus for controlling the size and the shape of the cross section of a light beam at its plane of incidence.
Figure 4B:
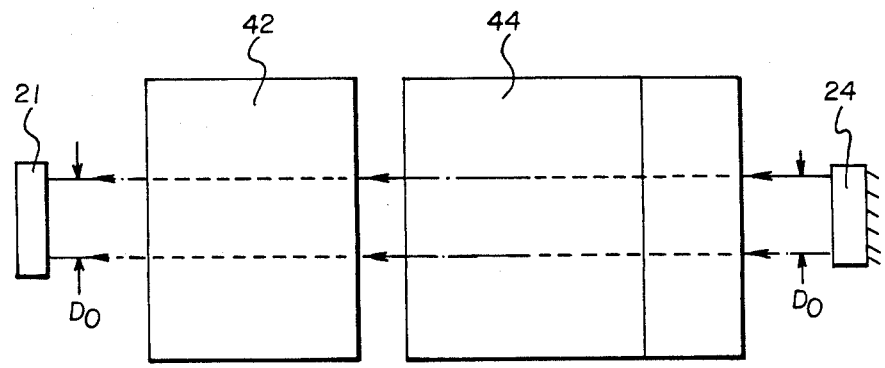
Figure 4C:
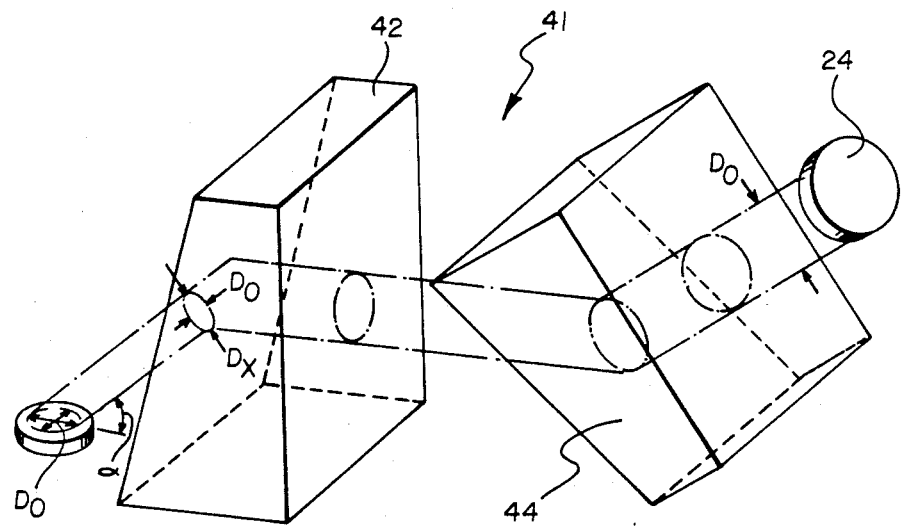

FIG. 4 illustrates anamorphic beam-contracting apparatus comprising an anamorphic prism pair 41 consisting of prisms 42, 44. To that end, each of the prisms 42, 44 is mounted at an incident angle, which is close to Brewster's angle, to the incoming beam. The side view of FIG. 4a shows that the prism pair narrows the height of the beam to the dimension $D_x$ from the original dimension $D_o$; the bottom view of FIG. 4b shows that the width of the beam is unchanged at $D_o$. Thus, FIG. 4(c) shows that the cross section of the light beam, perpendicular to the direction that the beam is traveling when it exits the prism 42, is elliptical with a minor axis $D_x$, in the plane of the drawing, and a major axis $D_o$, in a plane perpendicular to the drawing.

The cross section of the light beam, however, in its plane of incidence with the photodetector 21, is enlarged to the dimension $D_o$ (the dimension of the light-receptive surface), from the dimension $D_x$, in the plane of the drawing when the light beam impinges on the photodetector 21 obliquely at the angle $\alpha$. Thus, the prisms 42, 44 serve to narrow the cross section of the light beam in the appropriate direction(s) to cause the size and the shape of the cross section of the light beam in its plane of incidence to match the size and shape of the light-receiving surface of the photodetector.

Figure 5A:
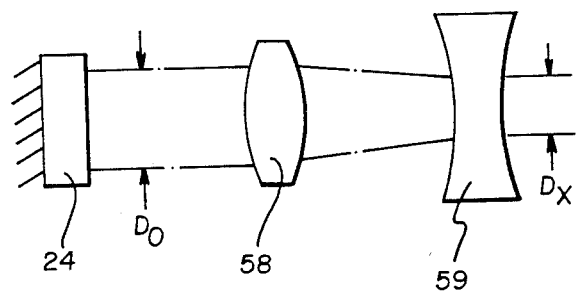
FIGS. 5(a) and 5(b) are cross-sectional views, similar to FIGS. 4(a) and 4(b), of lens apparatus for controlling the size and the shape of the cross section of a light beam at its plane of incidence.
Figure 5B:
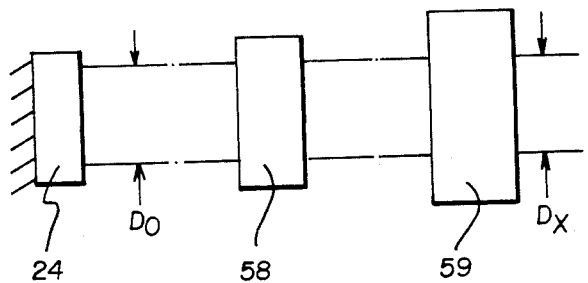

FIGS. 5(a) and 5(b) illustrate lens apparatus, which like the optical apparatus of FIG. 4, serves for narrowing the height of a light beam to a dimension $D_x$ from an original dimension $D_o$. To that end, the lens apparatus comprises a pair of cylindrial lenses 58 and 59.

The optical apparatus of FIG. 4 and the lens apparatus of FIG. 5 are particularly suitable for modifying the cross section of a light beam projected along a stationary optical path, like the optical path 19 of FIG. 1. For that purpose, such apparatus has an optical characteristic capable of providing differential beam contraction, i.e., anamorphic beam shaping.

Figure 6:
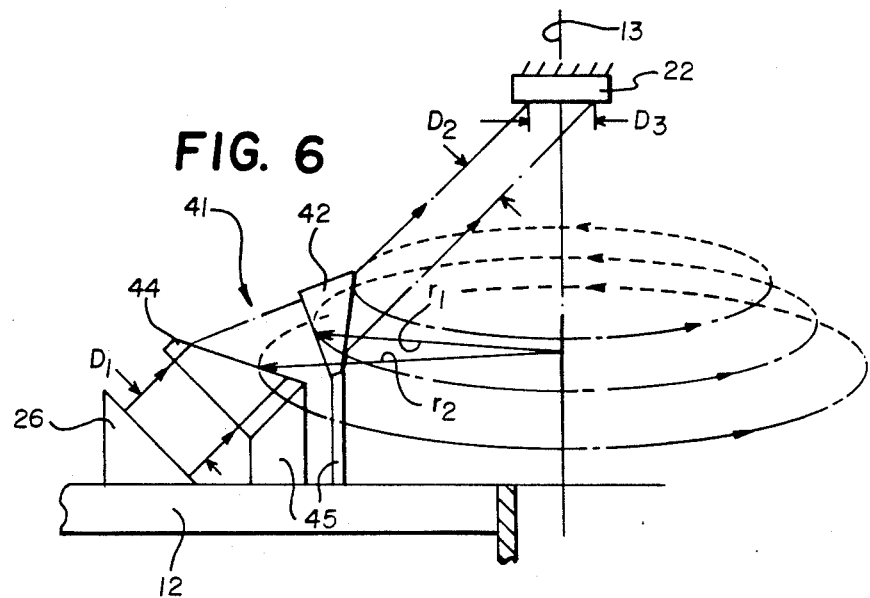
FIGS. 6, 7 and 8 are cross-sectional views of optical apparatus for anamorphic contraction of a light beam.

FIG. 6 illustrates the anamorphic prism pair 42, 44 of FIG. 4 in a form that is particularly suitable for use with head scanner apparatus having a rotating light path, like the light path 20 of FIGS. 1 and 2. To that end, the anamorphic prism pair 41 consists of two concentric, annular prism rings 42, 44, each of which is mounted for rotation with the headwheel 12. For that purpose, each prism is attached preferably by means of struts 45 to the headwheel.

Each annular prism defines a ring concentric with the rotational axis 13. The outer prism 44, as shown, has an inner radius of rotation, $r_2$, which is larger than the corresponding outer radius of rotation, $r_1$, of the concentric inner prism 42. Otherwise, the shape of the prism 42, but not its orientation, is similar to the shape of the prism 44. When the output of the laser 26 is linearly polarized, this arrangement minimizes the reflection losses and maintains the polarization state of the radiation. The prism pair of FIG. 6 introduces an anamorphic contraction of the height of the beam (in the plane of the drawing) while shifting the direction of the beam laterally. Any degree of ellipticity of the beam cross section can be produced with this type of device to regulate the cross section of the light beam in its plane of incidence.

Figure 7:
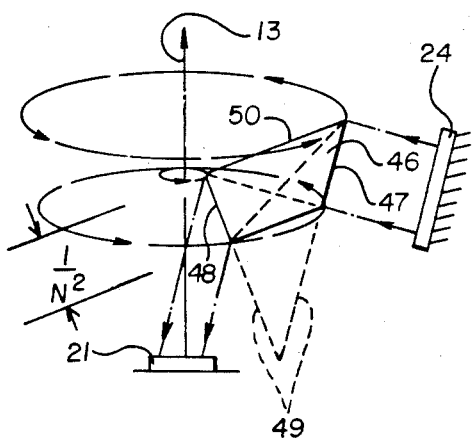

In an alternative embodiment, FIG. 7 illustrates an annular Littrow prism 46 which serves to narrow the light beam while deflecting it by exactly ninety degrees (90°). In this case, the beam is incident perpendicular (90°) to the outer surface 47 of the prism 46; after the beam enters the prism 46, it is totally internally reflected from the shorter side 50; then the beam exits the inner annular surface 48 at Brewster's angle, to provide a total deflection of exactly ninety degrees (90°).

Due to the orientation of the outer surface 47 and the inner surface 48, with respect to each other and the incident light beam, the prism 46 narrows the height of the light beam (in the plane of the drawing). The phantom lines 49 of FIG. 6 illustrate that the entire prism is not used for anamorphic beam contraction with 90° deflection. The apex of the prism is cut away, to leave a fraction, $1/N^2$, of the prism base, where N is the index of refraction.

Figure 8:
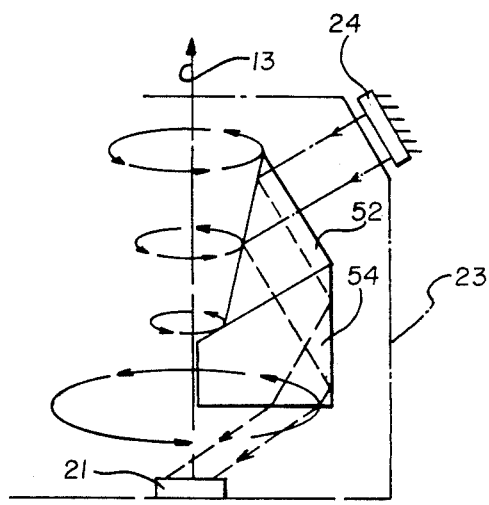

FIG. 8 shows optical apparatus comprised of an annular, 45° right-angle prism 52 cemented to the hypotenuse (truncated) of a circular Littrow prism 54. Similar to FIG. 6, the optical apparatus 23 of FIG. 8 serves to cause anamorphic beam contraction, while shifting the beam laterally with no directional deflection.

It will be appreciated by those skilled in the optics art, of course, that the apparatus of FIGS. 4 through 8 may be reversed to provide for anamorphic expansion of the light beam.

Furthermore, other arrangements of apparatus are within the scope of the invention for shaping the light beam precisely to the size and shape of the light-sensitive area of the photodetector. For that purpose, the optical apparatus of FIGS. 4 through 7 can be serially coupled to provide differential magnification or minification along non-orthogonal axes. The apparatus, on the other hand, can serve to provide uniform expansion or contraction of the light beam.

Accordingly, beam shaping (expansion or contraction) serves to adjust an information-bearing light beam so that its cross section, at its plane of incidence, is equal to the size and shape of the information-receptive surface of a photodetector. Thus, both the sensitivity of the photodetector and the transmitted light energy are fully and efficiently utilized, thereby to enhance the signal-to-noise of the optical channel.

Figure 9:
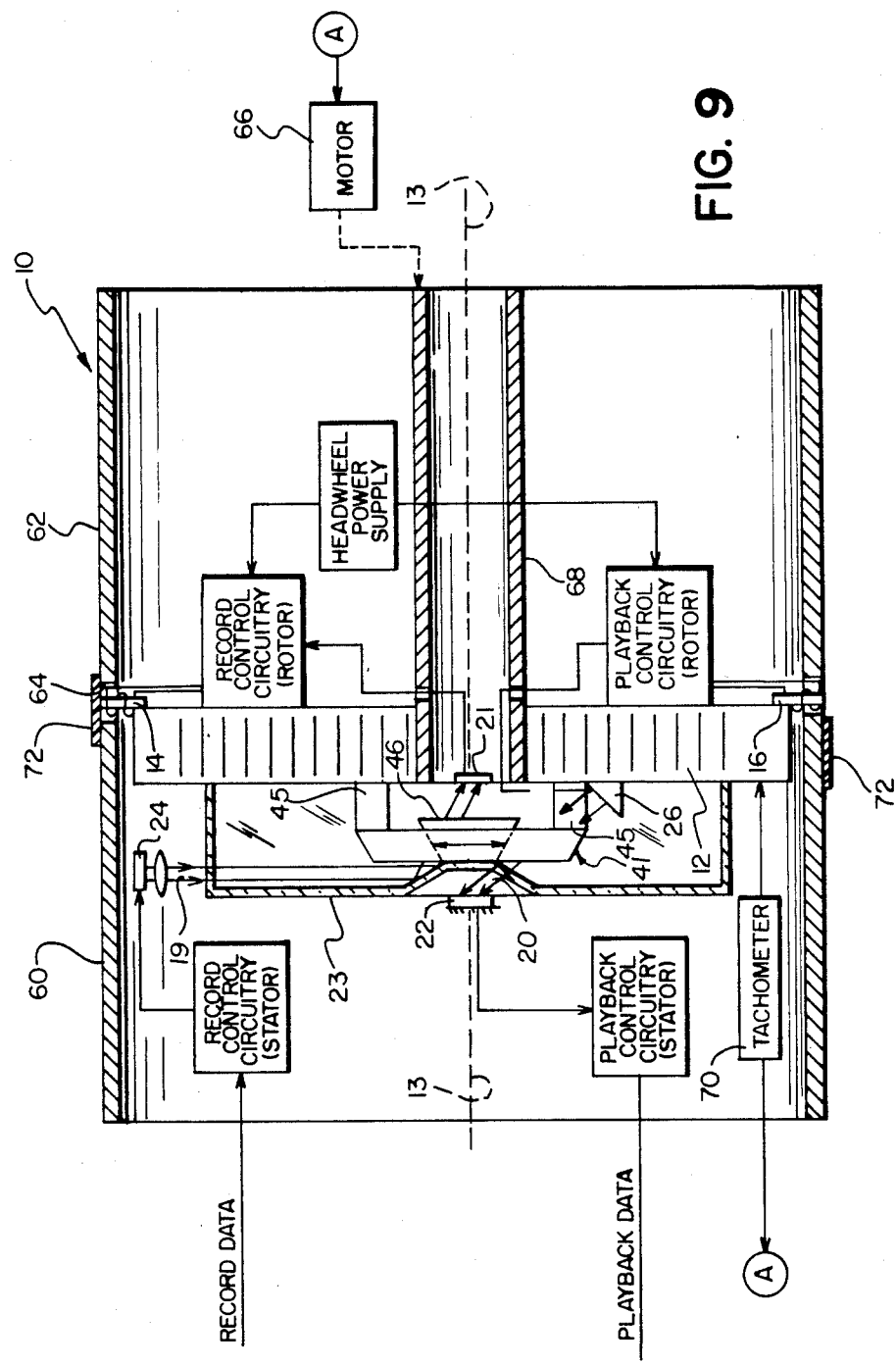
FIG. 9 shows a more complete side elevation view of rotary head scanner apparatus of the type having an optical signal-transmission channel in accordance with the invention.

FIG. 9 is a more complete illustration of rotary head scanner apparatus 10 having a bi-directional optical signal-transmission channel, in accordance with the invention. To that end, information-bearing light from the playback laser 26 passes through optical apparatus 41 of the type shown in FIG. 6 as an anamorphic prism pair. Light from the record laser 24, on the other hand, preferably passes through annular prism 46 (FIG. 7), which is located within the central aperture of the apparatus 41, as shown. Other elements of FIG. 9 that are structurally or functionally similar to elements of FIGS. 1 or 2 are identified by like numerals.

The scanner apparatus 10 further includes, generally, two coaxially arranged drum sections 60 and 62 separated to form a circumferential gap 64. A motor 66 drives a rotating element such as a hollow shaft 68, which carries the headwheel 12 at the center of the drum sections for rotation in an operational plane in alignment with the gap 64.

A tachometer 70 serves to cause the motor 66 to drive the headwheel 12 at the appropriate speed. In particular, the so-called "once around" tachometer is suitable in this respect because it controls the phase and speed of the headwheel 12.

The headwheel 12 carries the record head 14 and the playback head 16 so that the tip of each head extends slightly beyond a plane common to the exterior surfaces of the two drum sections 60 and 62. When a magnetic tape 72 travels through a spiral path while partially wrapped about the drum sections, the headwheel 12 moves the tip of each magnetic head across the tape in parallel tracks which are inclined with respect to a longitudinal edge of the tape.

Record and playback electronics mounted on the headwheel 12 can receive power from a generator (not shown) on the shaft 68. Alternatively, as it taught in U.S. Pat. No. 4,455,584, a rotary transformer (also not shown) can conduct medium frequency AC power from the stationary to the rotary side of the scanner apparatus 10. Electronics mounted on the headwheel 12 would rectify this power.

ADVANTAGEOUS TECHNICAL EFFECT

From the foregoing, it is apparent that an improved optical signal-transmission channel has been disclosed for rotary head scanner apparatus. With an optical channel of the type having at least one photodetector on the rotational axis of the head scanner and a corresponding off-axis light source that projects a collimated beam of information-bearing light obliquely onto the photodetector, the invention, by means of optical apparatus, provides for matching the size and shape of the light beam, at its plane of incidence with the photodetector, with the size and shape of the light-sensitive area of the photodetector. With this arrangement, the light beam is neither too large, which would waste optical energy, nor is it too small, which would reduce the sensitivity of the photodetector. Thus, maximum electro-optical "action" is effected, to enhance the signal-to-noise ratio of the optical channel.

The invention has been described in detail with reference to the figures, however, it will be appreciated that variations and modifications are possible within the spirit and scope of the invention.

What is claimed is:

1. In rotary scanner apparatus including magnetic transducer means on the periphery of a rotatable headwheel having a central axis of rotation, and means for coupling a record or playback signal to or from, respectively, said transducer means by obliquely projecting a beam of information-bearing light from an off-axis light source onto the light-sensitive surface of a photodetector on the axis of said headwheel, the improvement wherein:

said rotary scanner apparatus further includes optical apparatus, interposed between said light source and said photodetector and arranged to rotate in synchronism with said headwheel, having an optical characteristic for anamorphic beam shaping, to cause the size and shape of the cross section of the light beam, at a plane of incidence coinciding with said photodetector, to correspond substantially to the size and shape of the light-sensitive surface of said photodetector, said optical apparatus further having a conical light-reflective portion defining a surface of revolution centered about the central axis of rotation, in intersecting relationship with an optical path along which the information-bearing beam of light is projected, at an angle to deflect incident light onto the light-sensitive surface of said photodetector.

2. Rotary scanner apparatus as claimed in claim 1 wherein said optical apparatus provides for anamorphic beam contraction.

3. Rotary scanner apparatus as claimed in claim 2 wherein said optical apparatus combines anamorphic beam contraction with directional deflection of the information bearing light beam.

4. In rotary scanner apparatus including magnetic transducer means on the periphery of a rotatable headwheel having a central axis of rotation, and means for coupling record and playback signal to and from said transducer means by obliquely projecting separate collimated beams of information-bearing light from first and second off-axis light sources onto the light-sensitive surface of a pair of corresponding photodetectors spaced apart on the axis of said headwheel, the improvement wherein:

a transparent structure, interposed between said first and second light sources and said pair of corresponding photodetectors and arranged to rotate in synchronism with said headwheel, having an optical characteristic for shaping such beam of information-bearing light anamorphically, to cause the size and shape of the cross section of each beam, at a plane of incidence coinciding with its respective photodetector, to correspond substantially to the size and shape of the light-sensitive surface of such photodetector, said transparent structure further having a conical light-reflective portion defining a surface of revolution centered about the central axis of rotation, in intersecting relationship with an optical path along which each information-bearing light beam is projected, at an angle to direct each incident light beam onto the light-sensitive surface of its corresponding photodetector.

* * * * *

UNITED STATES PATENT OFFICE
CERTIFICATE OF CORRECTION

PATENT NO. : 4,819,096
DATED : April 4, 1989
INVENTOR(S) : F. F. Grant and J. P. Grant It is certified that error appears in the above-identified patent and that said Letters Patent is hereby corrected as shown below:

Title page:

| | |
|---|---|
| Abstract, line 10 | "cuase" should read --cause-- |
| Abstract, line 14 | "of" should read --for-- |
| Column 2, line 29 | delete "of" (first occurrence) |
| Column 9, line 12 | "such" should read --each-- |

Signed and Sealed this

Third Day of October, 1989

Attest:

DONALD J. QUIGG

Attesting Officer

Commissioner of Patents and Trademarks